(Specimens.)
X. ZGRAGGEN.
GLASSWARE.
No. 446,590. Patented Feb. 17, 1891.
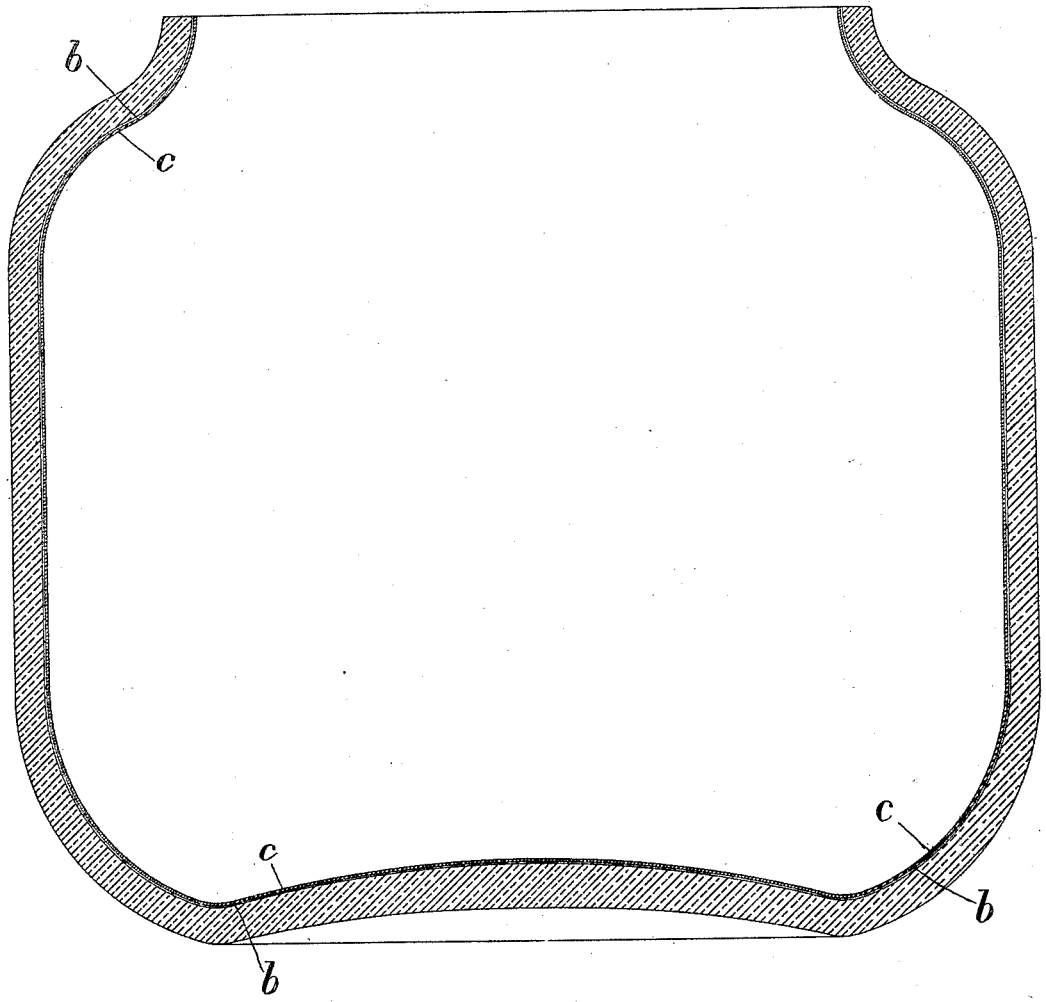
WITNESSES
N. L. Gill
W. B. Corwin
INVENTOR
Xaver Zgraggen
by W. Bakewell & Sons
his Attorneys

UNITED STATES PATENT OFFICE.

XAVER ZGRAGGEN, OF MARTIN'S FERRY, OHIO.

GLASSWARE.

SPECIFICATION forming part of Letters Patent No. 446,590, dated February 17, 1891.

Application filed June 23, 1890. Serial No. 356,424. (Specimens.)

*To all whom it may concern:*

Be it known that I, XAVER ZGRAGGEN, of Martin's Ferry, in the county of Belmont and State of Ohio, have invented a new and useful Improvement in Glassware, of which the following is a full, clear, and exact description.

The object of my invention is to improve the manufacture of hollow glassware, such as lamps, table-ware, vases, &c., and to render it possible to provide such articles with a durable plating of metal, such as gold, silver, &c.—which will not be subject to be injured by fluid contents of the glassware and will not be liable to become abraded and to wear off in the ordinary course of use.

In making articles embodying my invention I first deposit on the article of glassware by a suitable chemical process a thin film or coating of precious metal, such as gold or silver, which by reason of its thinness is very subject to abrasion and injury. To protect this film from wear and from the action of liquids, I cover it with an additional and heavier coating of some cheaper metal—such as copper—by means of the process of electroplating, this coating being made of sufficient thickness to withstand any ordinary usage.

I shall now describe the method which I use for making my improved article of manufacture, so that others skilled in the art may practice the same, reference being had to the accompanying drawing, which shows in vertical section a hollow article of glassware embodying my invention.

*b* represents the inner film of precious metal, and *c* is the outer electro-deposited protecting coating. These parts are exaggerated in proportions for the purpose of more clearly illustrating the invention.

From the following description the skilled chemist will perceive various modes of making glass articles according to my invention; and the method which I describe is designed to be illustrative, and is not intended to restrict the scope of my invention to an article of glassware made precisely in conformity with said method.

In making a silver coating I take an article of hollow glassware, wash and clean it thoroughly, dissolve sixty grains of nitrate of silver and thirty-eight grains aldehyde-ammonia in one quart of distilled water, put this solution into the article and heat the whole to about 130° Fahrenheit, when the silver will begin to deposit itself on the article and will continue to do so while the whole is gradually heated to 142° Fahrenheit, when the deposit will be complete. The article is then well rinsed in distilled water.

To make a gold coating, I take twenty grains of chloride of gold, dissolve it in eight ounces of distilled water, and add caustic potash until an alkaline reaction is produced. I then add to this solution twelve minims of a mixture containing equal volumes of glycerine of 28° Baumé and distilled water and pour the compound solution into the article, when it will be coated with the required gold film in a few minutes.

Having coated the article, as above described, with either silver or gold or other suitable metal or alloy, I place it in an electroplating solution, which may be prepared as follows: I dissolve twenty-five parts of sulphate of copper in one hundred parts of water, mix this solution in a solution of twenty-eight parts of tartrate of soda and potassium in one hundred parts of water, and add sufficient of saturated solution of caustic potash to dissolve the precipitate. Having placed the glass article in this solution, I connect it by a wire to the negative pole of a battery. I immerse in the solution the anode, which consists of a piece of copper, and by establishing the electric circuit I deposit the copper in the usual manner of electroplating. This process is continued until the inner film has been covered with a protecting coating of sufficient stoutness to resist the deteriorating action of abrasion and wear to which the article may be subjected in use and in cleaning it. Other metals than copper may be used as a protective coating, and, if desired, metal of the same nature may be used for the outer coatings as for the inner film, though for economic reasons this is not desirable when gold or silver is the metal employed.

It case it should be desired to coat the article with metal on both inner and outer surfaces, the article may be immersed in the gold or silver solution. It is sufficient, however to coat it on the inside, as described above since the coating, being made apparent by the transparency of the glass, gives a beautiful and brilliant effect.

I am aware that articles of hollow glassware have been coated with silver, &c.; but heretofore, in order to protect the thin metal film from abrasion, it has been necessary to make the article with double walls. Such mode of manufacture is expensive and is of limited application, since it can only be practiced in making articles of certain shapes.

The advantages of my improvement will be appreciated by those skilled in the art.

Articles embodying my invention are easy of manufacture, are very durable, and enable many beautiful effects to be produced at but little cost.

I claim—

As a new article of manufacture, a hollow article of glassware whose interior surface is lined with a compound metallic coating consisting of a chemically-deposited metal film next to the glass, and an electro-deposit of metal which backs and protects said film, substantially as and for the purposes described.

In testimony whereof I have hereunto set my hand this 23d day of May, A. D. 1890.

XAVER ZGRAGGEN.

Witnesses:
 GEO. G. SEDGWICK,
 LEWIS E. SMITH.